May 15, 1934.　　　A. S. WALTON　　　1,958,650
ELECTRICAL APPARATUS
Filed June 9, 1930
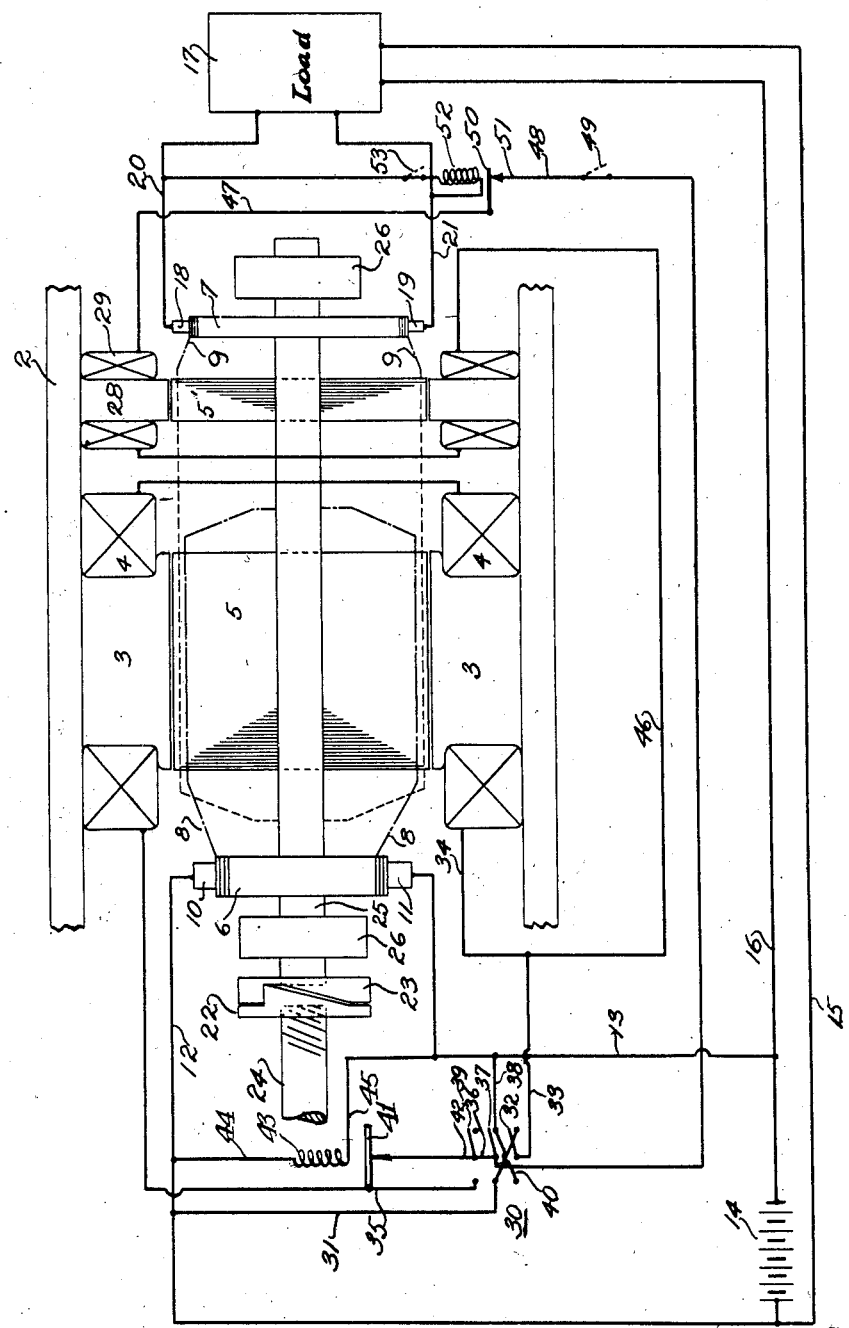
Inventor
*Albert S. Walton.*
By *F. B. Smith*
Attorney Patented May 15, 1934

1,958,650

UNITED STATES PATENT OFFICE 1,958,650

ELECTRICAL APPARATUS

Albert S. Walton, East Orange, N. J., assignor to Eclipse Aviation Corporation, East Orange, N. J., a corporation of New Jersey Application June 9, 1930, Serial No. 460,009

11 Claims. (Cl. 171—123)

This invention relates to dynamo-electric machines and more particularly to multiple-wound dynamo electric machines.

One of the objects of the present invention is to provide a novel dynamo-electric machine capable of operation as either a generator or dynamotor.

Another object of this invention is to provide a novel dynamo-electric machine capable of operation as either a multiple current generator or a dynamotor without any appreciable difference in the voltage output being caused by a change from one to the other.

Another object of the present invention is to provide a dynamo-electric machine capable of operation as either a generator or dynamotor in which the generated voltage of one winding may be varied independently of the other winding so that a constant voltage output may be maintained from that winding under all conditions of operation.

Another object of this invention is to provide in a dynamo-electric machine, an armature having a plurality of windings subject to the influence of a main field and one of the windings subject to the influence of an auxiliary field to boost up the voltage output of that winding when operating as a dynamotor.

Another object is to provide a novel arrangement of armature and field windings which will tend to maintain the output voltage of the machine substantially constant whether operated as a generator or dynamotor and which is efficient for the purpose intended.

One embodiment of the present invention is diagrammatically illustrated in the accompanying drawing, but it is to be expressly understood that the drawing is for purposes of illustration, and is not designed as a definition of the limits of the invention, reference being had for this purpose to the appended claims.

The voltage at the brushes of a dynamo-electric machine when no current is being delivered, is directly proportional to the armature speed, the number of magnetic flux lines cut by the inductors and the number of inductors in series. If an additional winding is placed on the same armature, and both windings deliver no current and both sets of brushes are set on the no-load neutral point, the voltages at the respective brushes will be directly proportional to the number of turns of the respective windings. If, however, the inductors of one of those windings are made to cut auxiliary magnetic flux lines in addition to the common or main flux lines, the voltage generated at the brushes of this winding will be greater or less, depending upon the direction of the auxiliary flux lines, by an amount equal to the voltage generated by the portions of the inductors cutting the auxiliary flux lines. This theory has been applied in the present invention to produce a dynamo-electric machine capable of operation either as a double voltage generator, or as a dynamotor, in which the voltage produced during dynamotor operation is maintained substantially the same as the voltage produced as a generator.

In the drawing, 2 represents the frame of the dynamo-electric machine upon which are mounted the main field pole pieces 3 disposed at the proper angle on the interior of the frame. Coils 4 of the proper number of ampere turns are so wound on the pole pieces 3 as to constitute the conventional north and south poles. Within the frame and between the pole pieces 3 is a rotor 5 having a commutator 6 at one end and a commutator 7 at the other end. A low voltage armature coil 8 of the proper number of ampere turns is wound in slots on rotor 5 and the ends of the coil are connected with the commutator 6. A second high voltage armature coil 9 is wound on the rotor 5 in the same slot with the coil 8 and has its ends connected with the commutator 7. The windings of the coil 8 extend only to a distance within the range of the main field flux created by the coils 4, but the high voltage coil 9 extends beyond the range of the main field flux and under an auxiliary flux as as hereafter described.

Brushes 10 and 11 are provided for collecting the current generated in the low voltage winding 8, and by means of leads 12 and 13 are connected with a battery 14. A constant load-consuming device 17, which in the present illustration may be a radio tube filament circuit, is connected in parallel with the battery and brushes by means of leads 15 and 16. Brushes 18 and 19 are provided for collecting current from the commutator 7, which is generated by the high voltage armature coil 9, and supplies the same by means of leads 20 and 21 to a constant current-consuming device such as the plate circuit of a radio set.

The dynamo-electro machine of the present invention is adapted to be directly connected to an internal combustion engine such as used on airplanes. To this end, a jaw clutch is provided having a part 22 mounted on a shaft 24 directly connected with the engine and a cooperating part 23 mounted on the armature shaft 25. The part 22 of the clutch is adapted to be moved out of engagement with the part 23 when the machine is operating as a dynamotor. The armature shaft 25 is rotatably mounted in bearings 26 formed as part of the frame 2. The armature rotor 5 may be connected with the armature shaft 25 in any well-known manner.

When the machine is operating as a dynamotor the voltage losses and the armature reaction are such that the effective voltage of the battery is not applied, which results in a slower rotational speed and a lower high voltage output generated by the winding 9 and main field winding 4.

Means are provided for increasing the number of flux lines cut by the armature winding 9 when the machine operates as a dynamotor to equalize or compensate for the lower speed of the rotor, so that a constant high voltage output is maintained whether operating as a generator or a dynamotor. To this end, auxiliary pole pieces 28 are mounted on the interior of the frame 2 and disposed in the proper angular position. On the pole pieces 28 are wound coils 29 having the proper number of ampere turns. An auxiliary rotor 5' is fixed to the shaft 25 adjacent the rotor 5 for receiving the extensions of the high voltage winding 9 which cooperate with the flux lines created by this winding 29. The high voltage armature coil 9 only is subjected to the flux lines set up by this auxiliary winding, as the coils of the low voltage winding 8 are terminated short of the range of this auxiliary field.

A three-pole double-throw switch 30 is provided for controlling the function of the machine as either a generator or dynamotor. When the machine is to be operated as a generator, the switch 30 is thrown to the right. In this position of the switch, the main field 4 is energized from the output of the low voltage armature winding 8 by means of leads 12 and 31, blade 32, leads 33 and 34 to the coil 4 and the current is returned back through leads 35, jumper 36, blades 37 and leads 38 and 13 to the brush 11. In this position of the switch 30 the blade 39 and jumper 40 are open circulated. A voltage regulator is provided in this shunt field circuit having a vibrating contact 41 of magnetic material and a stationary contact 42 electrically connected with the jumper 36. An actuating voltage coil 43 is connected across the brushes 10 and 11 by means of leads 44 and 45.

The auxiliary field coil 29 may be employed, if desired, while the machine is operating as a generator for boosting the voltage output, but is usually not so connected. When used on the generator as a booster, the field is energized by means of lead 46 connected with lead 34 of the main field to coil 29 and is returned by leads 47 and 48 to the blades 37 of the switch 30 and back to the brush 11 by the leads common to the main field 4. With this arrangement the two shunt fields are in parallel. A switch 49, however, is provided in the return lead 48 for opening this auxiliary field circuit. A voltage regulator is provided in this auxiliary field circuit and is comprised of a vibrating contact 50 and a stationary contact 51. A voltage coil 52 is connected across the leads 20 and 21 of the high voltage output for actuating the magnetic contact 50. A switch 53 is provided in this actuating coil circuit for decreasing the current losses when the voltage regulator is not in use.

When the machine is operated as a dynamotor the clutch member 22 is disconnected, the switch 30 is turned to the left, and the switches 49 and 50 in the auxiliary field circuit are closed. The low voltage armature winding 8 is then energized by the battery 14 through leads 12 and 13 which are electrically connected with the brushes 10 and 11. The main field 4 is energized from the battery by lead 31, blade 37 of the switch, jumper 36, blade 39 and by lead 35, to the coil 4. The return circuit is through leads 34 and 33 to blade 32, jumper 40, leads 38 and 13, and then back to the battery 14. The auxiliary field is energized from the blade 37 of the switch through leads 48, voltage regulator contacts 50 and 51, leads 47 through coil 29, and back through leads 46 and 33 to the battery, the same as in the main field.

As is quite apparent, the two field windings are in parallel, but the direction of flow of current into brushes 10 and 11, commutator 6, and coils 8, is reversed when operating as a dynamotor from the direction of current in the field windings when the machine is operated as a generator. As a result the direction of rotation of the armature rotor is reversed, which corrects the lag of the brushes 10 and 11 when acting as a generator to a lead acting as a motor. With this arrangement the brushes 10 and 11 may be set in one position for either the motor or generator function.

When the machine is mechanically driven and operates as a double-wound armature generator, the voltage output of both of the armature windings can be effectively controlled by the voltage regulator contacts 41, 42 in the main field circuit. When the high voltage output is boosted by adding the auxiliary field produced by the coil 29, the voltage regulator contacts 50, 51 in this auxiliary field circuit may be rendered inoperative by opening the switch 53. However, when the machine is operated as a dynamotor and the switch 30 is thrown to the left, the voltage regulator in the main field circuit is short circuited and the voltage output of the high voltage winding 9 is controlled by controlling the auxiliary field current by means of the voltage regulator contacts 50, 51 in this circuit.

As is readily apparent, a dynamo-electric machine has been provided which may operate either as a mechanically driven double-wound armature generator, or a dynamotor in case of emergency. When used as a mechanically driven generator, the voltage output is effectively controlled at all times. Further, a machine has been provided which is capable of maintaining the high voltage output substantially constant irrespective of whether the machine is mechanically driven or driven as a dynamotor.

It will be obvious that the invention is not limited to the specific form described and illustrated in the drawing, but is capable of a variety of electro-mechanical embodiments. Various changes which will now appear to those skilled in the art may be made in the form, details of construction, and arrangement of the parts, without departing from the spirit of the invention, and reference is therefore to be had to the appended claims for a definition of the limits of the invention.

What is claimed is:

1. In a double voltage generator of the type which normally operates as a generator but is adapted to be operated as a dynamotor for emergency purposes, in combination with a plurality of armature windings and a cooperating magnetic field, an auxiliary armature, an auxiliary magnetic field and means for connecting said auxiliary magnetic field in parallel relationship electrically with said first named magnetic field to maintain the voltage output during operation of a dynamotor at the same E. M. F. as is produced during normal operation, and means for reversing the direction of rotation of said armature to change from one condition of operation to the other.

2. In combination with a multi-current generator having a plurality of armature windings, an auxiliary armature drum onto which a portion of one of said windings extends, an auxiliary magnetic field cooperating with said auxiliary armature and electrically connected in parallel relation to the main field for the purpose of augmenting the voltage normally generated in the extended windings of said generator, and means for reversing the direction of rotation of said armature to change from one condition of operation to the other.

3. In a dynamo-electric machine having a plurality of armature windings, a main field adapted to cooperate with each of the armature windings, an auxiliary field adapted to cooperate with one of said windings only, means for disconnecting said auxiliary field, and means for connecting the auxiliary field in parallel relation to the main field, whereby the voltage output of the one winding may be maintained constant when operated either as a generator or a dynamotor, and means for reversing the direction of rotation of said armature to change from one condition of operation to the other.

4. In an apparatus of the class described, a generator having a double-wound armature adapted to normally deliver high and low voltages, a variable load circuit including a storage battery adapted to receive current from the low voltage end of the generator, said generator being also adapted to receive energy from said battery and to be operated thereby as a dynamotor, a constant load circuit at the high voltage end of said generator, means for reversing the direction of rotation of said armature to change from generator to dynamotor operation, and means for maintaining the E. M. F. delivered to the constant load circuit substantially the same during both generator and dynamotor operation.

5. In apparatus of the class described, a generator having a double-wound armature adapted to normally deliver high and low voltages, a variable load circuit including a storage battery adapted to receive current from the low voltage end of said generator, a constant load circuit at the high voltage end of said generator, means including a normally inactive auxiliary field winding for increasing the electromagnetic inductive effect during the dynamotor operation, a voltage regulator in said variable load circuit effective upon the variable and constant load circuits when said auxiliary field winding is inactive, and a second voltage regulator for automatically maintaining a constant E. M. F. in said constant load circuit independently of variations in the E. M. F. of the variable load circuit.

6. In an apparatus of the class described, a generator having a double-wound armature adapted to normally deliver high and low voltages, a variable load circuit including a storage battery adapted to receive current from the low voltage end of said generator, said generator also being adapted to receive energy from the battery and to be operated thereby as a dynamotor, a constant load circuit for the high voltage end of said generator, means including an auxiliary armature and an auxiliary field winding for augmenting the high voltage generated during dynamotor operation, and means interposed in said auxiliary field circuit for maintaining the potential of the constant load circuit substantially constant.

7. In a dynamo-electric machine having an armature which is normally adapted to be mechanically driven and a field coil system cooperating with said armature to generate a plurality of voltages, means including a battery for feeding current to said armature windings to operate said machine as a dynamotor, and means for reversing the direction of rotation of the armature when changing from a double voltage generator to a dynamotor, the brushes being set in such relation to the neutral axis of said field coil system that the lag of said brushes when mechanically driven is substantially equal to their lead when drawing current from said battery.

8. In a dynamo-electric machine having an armature which is normally adapted to be mechanically driven and a field coil system cooperating with said armature to generate a plurality of voltages, means including a battery for feeding current to said armature windings to operate said machine as a dynamotor, and a circuit breaker for controlling the operation of the machine as either a generator or a dynamotor and for reversing the direction of rotation when changing from one to another, the brushes being set in such relation to the neutral axis of said field coil system that the lag of said brushes when mechanically driven is substantially equal to their lead when drawing current from said battery.

9. In a dynamo electric machine, a rotor comprising a pair of armatures and a winding on each of said armatures, the winding of one extending over to the other, a separately controlled field coil system for each armature, a commutator for each armature, a plurality of brushes bearing on each armature, said brushes being permanently shifted from the neutral axis to secure proper commutation while said armatures are being mechanically driven, means for mechanically driving said armatures, means including a battery in circuit with one of said armature windings for operating said machine as a dynamotor when said mechanical means is inoperative, and means for reversing the direction of rotation of the armature when changing from a mechanically driven generator to a dynamotor, said means comprising a switch for simultaneously reversing the energization of the field windings for each armature whereby the polarity of the E. M. F. supplied by the first named armature is maintained constant, and the fixed brush setting for the second armature provides the proper spacing from the neutral axis for correct commutation while drawing current from said battery.

10. In combination with a driving shaft, a generator having a plurality of generating windings, means for drivably connecting said shaft and generator including a shiftable clutch, load circuits normally connected to said generating windings, a battery connected to one of said load circuits, means operative in the disengaged position of said clutch for reversing the direction of rotation of said generator, and means simultaneously operable for connecting said battery to one of said generating windings to operate the generator as a dynamotor.

11. In an apparatus of the class described, a generator having a double-wound armature adapted to normally deliver high and low voltages, a variable load circuit including a storage battery adapted to receive current from the low voltage end of said generator, said generator also being adapted to receive energy from the battery and to be operated thereby as a dynamotor, a constant load circuit for the high voltage end of said generator, means including an auxiliary armature and an auxiliary field winding for augmenting the high voltage generated during dynamotor operation, and means for reversing the direction of rotation of the armature and simultaneously reversing the direction of current flow in the field windings for each armature.

ALBERT S. WALTON.